United States Patent [19]

Knothe et al.

[11] 4,150,730

[45] Apr. 24, 1979

[54] ELECTROMAGNETICALLY COMPENSATING WEIGHING OR FORCE-MEASURING DEVICE

[75] Inventors: Erich Knothe, Bovenden; Christoph Berg, Gottingen, both of Fed. Rep. of Germany

[73] Assignee: Sartorius Werke GmbH, Gottingen, Fed. Rep. of Germany

[21] Appl. No.: 860,087

[22] Filed: Dec. 13, 1977

[30] Foreign Application Priority Data

Dec. 23, 1976 [DE] Fed. Rep. of Germany ....... 2658628

[51] Int. Cl.² .............................................. G01G 7/00
[52] U.S. Cl. .................................................. 177/212
[58] Field of Search ......................... 177/210 EM, 212

[56] References Cited

U.S. PATENT DOCUMENTS

| | | | |
|---|---|---|---|
| 3,092,197 | 6/1963 | Ecker | 177/212 X |
| 3,688,854 | 9/1972 | Strobel | 177/212 X |
| 3,786,678 | 1/1974 | Kunz | 177/212 X |
| 3,968,850 | 7/1976 | Gaskill | 177/212 X |
| 4,034,819 | 7/1977 | Akers et al. | 177/212 X |
| 4,062,417 | 12/1977 | Kunz | 177/212 |

Primary Examiner—George H. Miller, Jr.
Attorney, Agent, or Firm—Browdy and Neimark

[57] ABSTRACT

An electromagnetically compensating force-measuring or weighing device includes a working coil disposed in the air gap of a fixed magnetic circuit which includes a permanent magnet. The working coil is subject to the influence of the load to be measured. An indicator responsive to the position of the working coil, has its output fed to a control amplifier, the working coil being fed the output signal from the control amplifier whereby it is brought to the zero position. An additional coil is connected electrically in series with the working coil, the magnetic field produced by the additional coil being determined by a measurement sensor. The output signal of the measurement sensor is a measure of the load to be measured.

27 Claims, 5 Drawing Figures

ELECTROMAGNETICALLY COMPENSATING WEIGHING OR FORCE-MEASURING DEVICE

BACKGROUND OF THE INVENTION

This invention relates to an electromagnetically compensating weighing or force-measuring device with a working coil movable in an air gap of a fixed magnetic circuit and influenceable by the load to be measured. The invention relates, more particularly, to such a device having an indicator for indicating the position of the working coil and also having a control amplifier coupled to the indicator. The working coil is fed by an output signal from the control amplifier and is thereby brought to the zero position.

In electromagnetic force compensation of the type mentioned above, the working coil, subjected to the influence of the load to be measured, is held in a zero position by controlling the current flowing through the working coil, so that the current I flowing through the coil, by the formula $$F = B \times I \times n \times 2\pi r$$

constitutes a measure of the electromagnetically produced force F and consequently the load to be measured. In the equation set out above: B is the magnetic flux density of the magnet system; I is the current in the coil; n is the number of turns on the working coil; and $2\pi r$ is the length of one turn of the working coil.

In the above set out formula, it is generally assumed that the magnetic flux density B is constant, so that the current I in the working coil is directly proportional to the electromagnetically generated force.

In general, the coil current I is converted into a measured voltage in a measuring resistance, and this measured voltage is then converted into digital form by means of an analog/digital converter, by comparing it with an internal reference voltage.

In such an arrangement, a permanent magnet is generally used as the principal component the magnetic circuit, while the reference voltage is generally provided by a reference diode, such as a Zener diode.

In such an arrangement, a number of difficulties and shortcomings arise. These are:

1. The temperature coefficient and the aging of the magnet falsify the measurement results;
2. The temperature coefficient and the aging of the measurement resistance also falsify the measurement result; the resultant systematic error having a particularly pronounced negative influence on measurement, because appropriately varying currents must be used for compensation of varying loads, whereby a varying amount of heat production and hence various temperature increases are produced; and
3. The temperature coefficient of the reference diode and hence the reference voltage as well as the aging of the reference diode, also falsify the measurement result, in addition, statistical voltage discontinuities in the reference diode cannot be avoided, and they likewise can influence measurement in an uncontrollable manner.

In addition to simple temperature compensation by additional temperature-dependent components, various possibilities are known for eliminating some or all of these possible errors in a systematic fashion.

One possibility is "quotient measurement". Two conventional systems are used simultaneously, the first system being subject to the influence of the load being measured and the second system being subject to the influence of a constant mass. In this manner, the second system replaces the reference diode.

In an embodiment according to German Federal Republic Pat. No. 1,194,167, the two conventional systems are disposed in two respective gaps of a magnetic circuit which includes the permanent magnet.

In another embodiment, disclosed in U.S. Pat. No. 3,322,222, the two conventional systems are located in the same gap.

In a device disclosed in Swiss Pat. No. 521,575, the magnetic flux density B is regulated by the second conventional system.

Finally, according to another proposal, the two conventional systems are guided by concentric cylinders with the aid of air cushions.

By using the solution provided by the above-mentioned dual systems, the two above-mentioned difficulties (1) and (3) are overcome, because these influences act upon the two systems in similar fashion, and hence can be eliminated by quotient formation. The above-mentioned problems and difficulties (2), however, nevertheless remain because the measurement resistances for the two systems are separate. Moveover, a device using the dual systems, quotient formation approach has a very complex design, since all of the individual parts must be provided in duplicate. Furthermore, such a device is expensive. Finally, changes in the zero setting of the second conventional system may not be recognized or even detected, so that the dual systems in use may falsify the measurement result.

In a modification of the aforementioned quotient measurement technique, a digitalization is also carried out, wherein the carrier current, in other words the current I flowing through the working coil, is broken up into pulses in the first system. In an embodiment according to German Federal Republic Pat. No. 1,194,167, the pulse frequency is proportional to the applied mass, while in a modification disclosed in Swiss Pat. No. 529,999 the pulse length is proportional to the applied mass.

In this fashion, the above-mentioned difficulty, designated by the numeral (2), can be eliminated, but the entire device still has a very complex structure and requires a large number of components because the second system must still be present.

Moreover, changes in the zero point of the second system still cannot be detected or recognized, thus leading to possible falsifying of the measurement result. Finally, a complex electronic circuit subject to the influence of temperature and aging is required to keep the pulse constant. In particular, the shape of the edges changes markedly with minor changes in the components. If the pulse shape is not kept constant, accurate measurement is no longer possible.

Finally, German Federal Republic Auslageschrift (Published Patent application) No. 2,511,103 discloses a digitalization in the control circuit. However, this eliminates only the problems described above under numerals (1) and (2), while the difficulty described above under the numeral (3) remains. Once again, this can be overcome using the prior art techniques only by resorting to the dual systems and effecting a quotient measurement. Thus, disadvantages remain. Moreover, the characteristic curve and the hysteresis of the soft-magnetic material in the magnetic circuits used constitute critical parameters.

SUMMARY OF THE INVENTION

The principal object of the present invention is to provide an electromagnetically compensating weighing or force-measuring device wherein significant resolution and long-term stability is improved.

It is another object of the present invention to provide an electromagnetically compensating weighing or force-measuring device which is of simple mechanical construction and which overcomes the above-mentioned difficulties and shortcomings.

It is a further object of the present invention to provide an accurate electromagnetically compensating weighing or force-measuring device which does not require dual systems.

It is an additional object of the present invention to provide an electromagnetically compensating device in which the effect of errors caused by the individual components are eliminated, especially the magnetic circuit, the measurement resistance and the reference diode components.

The objects set out above, as well as others which are to become clear from the text below, are achieved according to the present invention by virtue of the fact that an additional coil is connected in series electrically with the working coil, the magnetic field of this second coil being determined by a measuring sensor, the output signal of the measuring sensor being a measure of the load.

The advantages achieved by the invention reside particularly in that it is not the current flowing through the working coil which is determined, but rather a parameter proportional to the coil current which is determined by a measurement of the magnetic field. Hence, neither a measurement resistance nor a reference voltage is required, so that the problems set out above under numerals (2) and (3) cannot occur.

Known measurement techniques and conventional sensors, which are very precise and stable for a long periods of time, are available for measurement of the magnetic field, especially techniques and sensors which determine nuclear dipole resonance or spin resonance can be used. The precision of these conventional techniques and sensors resides in the fact that measurement and its evaluation can be referred to atomic constants. Measurement is influenced only by the atomic constants, a frequency standard (generally of a quartz crystal) for determination of the resonant frequency, as well as the geometric constants. All of these parameters are very stable, so that it can be assumed that they will not change in the course of time.

By this technique, a digital signal can be produced directly by determination of the resonant frequency; this is advantageous for further processing. Moreover, no analog/digital converter is required to practice the present invention. Finally, a device according to the present invention has a simple construction, because a complete second system need not be provided, as in the prior art devices which use quotient formation.

Advantageously, the measurement sensor for magnetic field measurement is disposed inside the coil, where it is well protected against external influences.

In order to detect changes in the magnetic field of the magnetic system, especially those due to temperature influences or aging, at least one additional measurement sensor is provided, advantageously in the air gap of the magnetic system, to determine the magnetic flux density B of the magnetic system, the output signal of the additional sensor, together with the output signal of the first measurement sensor, constituting a representation of the load to be measured. Hence, measurement of the magnetic flux density B and the coil current I are performed by a single measurement step, which simultaneously detects changes in the measurement result, produced by a variation in the magnetic field of the magnetic system.

If these two parameters are measured digitally, the product BxI can easily be calculated digitally, for example by using a microprocessor.

Advantageously, two measurement sensors are mounted in the air gap, so that the field pattern can be averaged.

The measurement sensors in the air gap can be mounted in a fixed position or can be mounted on the working coil.

Advantageously, the diameter of the additional coil used to determine the working coil current I is less than its length, resulting in a homogeneous magnetic field inside the additional coil.

The additional coil should be surrounded by a soft magnetic shield, in order to minimize influence from stray fields.

The magnetic field in the additional coil can be intensified by soft magnetic conductors. This material should have a linear magnetization curve and should not exhibit hysteresis.

BRIEF DESCRIPTION OF THE PREFERRED EMBODIMENTS

The invention is described below, reference being made to the accompanying drawings which illustrate a preferred embodiment of an electromagnetically compensating apparatus according to the present invention.

DETAILED DESCRIPTION OF THE PREFERRED EMBODIMENTS

Figure 1:
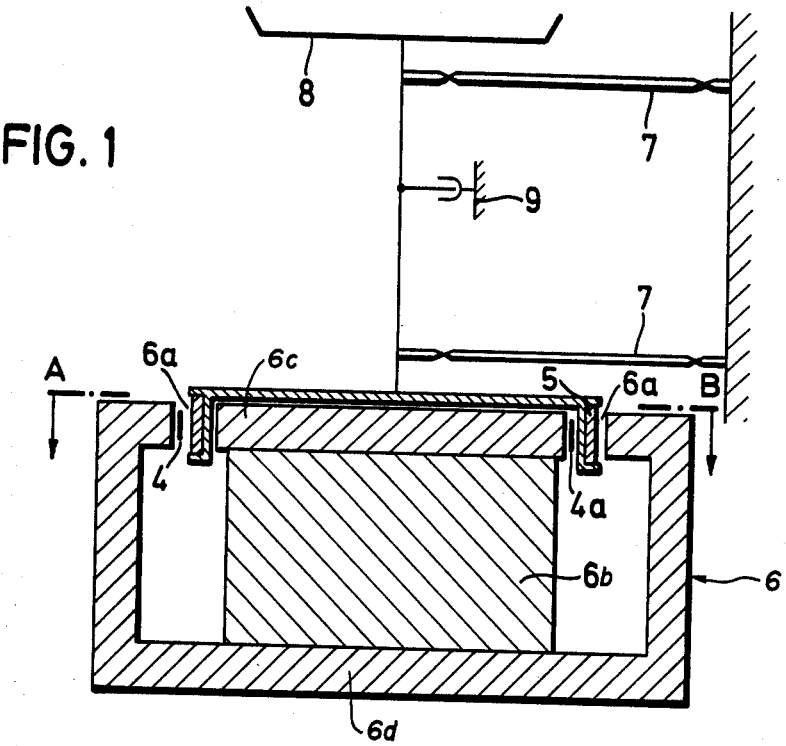
FIG. 1 is a diagram of an electromagnetically compensated weighing or force-measuring device provided with a magnetic circuit according to the present invention, in which the mechanical components are indicated schematically.
Figure 5:
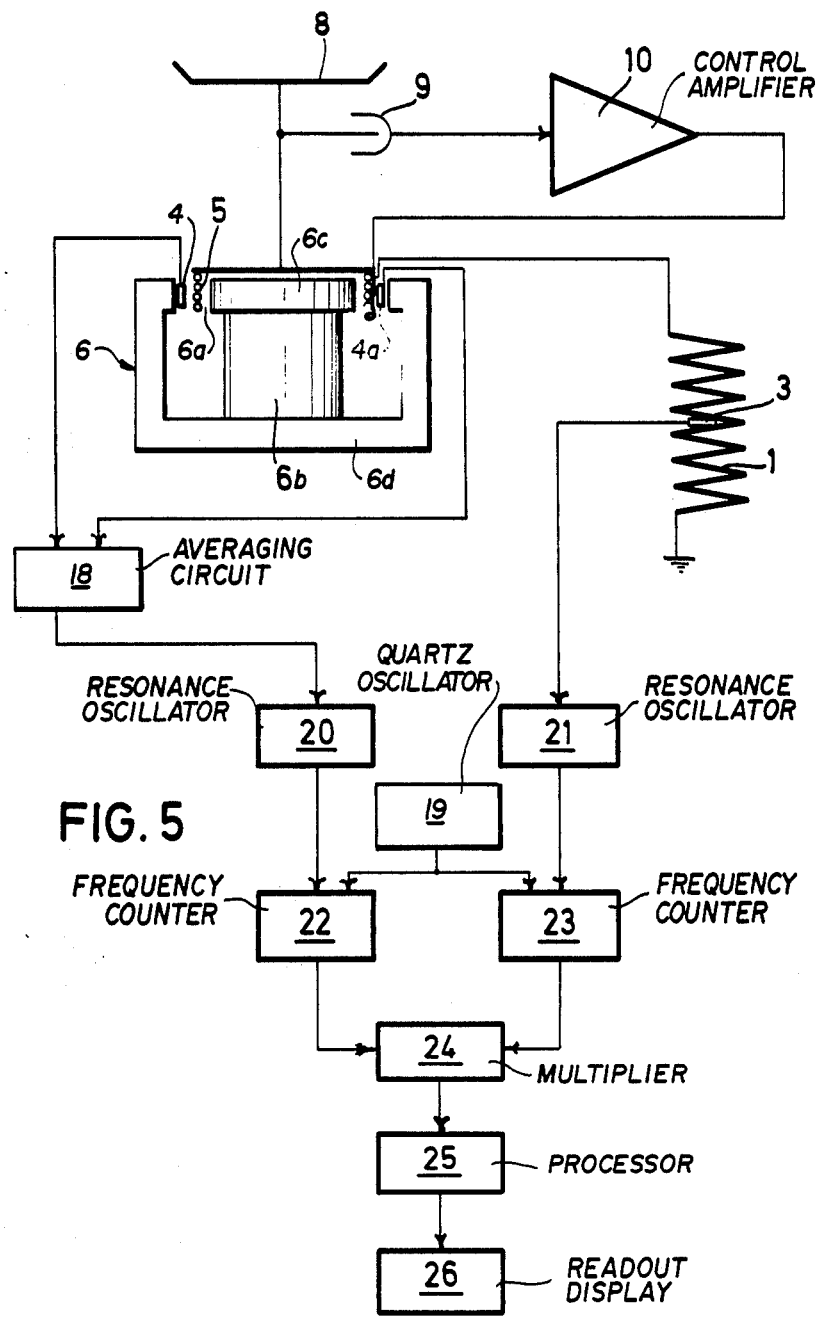
FIG. 5 is a schematic diagram of the electronic circuit and components of the device of FIG. 1, the mechanical and magnetic components being shown diagrammatically.

As shown in particular in FIGS. 1 and 5, a practical embodiment of an electromagnetically compensating weighing or force-measuring device according to the present invention includes a magnetic circuit 6 generally constituted by a permanent magnet 6b, a pole piece 6c, an air gap 6a and a yoke 6d. A working coil 5 is disposed in the air gap 6a of magnetic circuit 6.

As indicated schematically in FIGS. 1 and 5, the working coil 5 is directly connected by a member to a pan 8, on which the mass to be measured can be placed, the member being provided with conventional guides 7.

In addition, a position indicator 9 is mechanical connected to the member so that it moves with the working coil 5, the indicator indicating whether the working coil 5 is located in a predetermined equilibrium position in the air gap 6a of magnetic circuit 6, or has been deflected from this equilibrium under the influence of the force generated by a mass placed upon the pan 8.

When the working coil 5 is deflected downward in the air gap 6a by this force, as shown in the drawings, the position indicator 9 indicates this deflection, i.e. it generates a signal which changes the current supplied to the working coil 5, via a control amplifier 10, until the equilibrium position is reached once more. As described above, the electromagnetic force thus produced is proportional to the weight of the mass placed on the pan 8, so that the current required to reach the equilibrium position constitutes a measure of the weight to be measured.

As shown in FIG. 5, an additional coil 1 is connected electrically in series with the working coil 5 so that the magnetic field produced by the additional coil 1 is proportional to the current flowing through the working coil 5.

Figure 3:
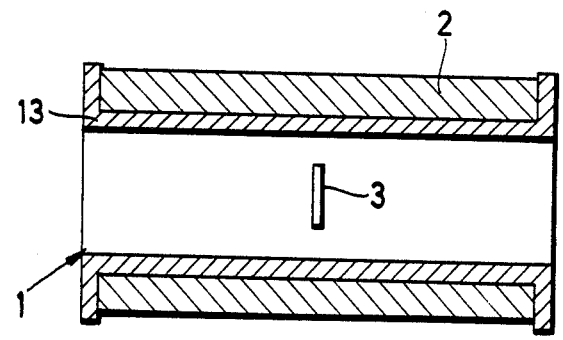
FIG. 3 is a cross-sectional view through the additional coil and the measurement sensor which are shown schematically in FIG. 5.
Figure 4:
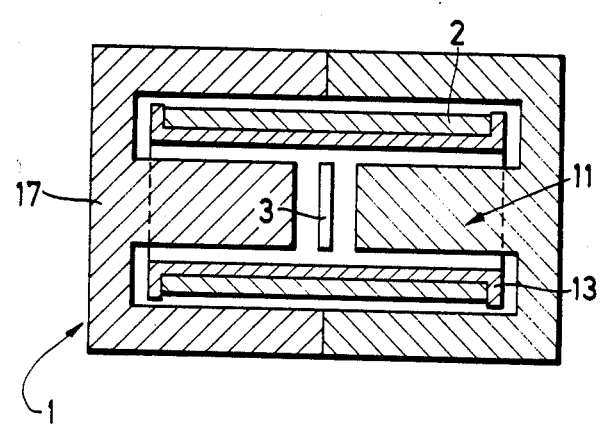
FIG. 4 is a cross-sectional view of an embodiment of a particularly advantageous coil, sensor and magnetic circuit having soft magnetic conductors and shielding which can be used in the device of FIG. 5.

Two possible designs of the additional coil 1 with associated components are shown in detail in FIGS. 3 and 4. In the simplest case, the additional coil 1 can consist of a cylindrical hollow body 13, provided with a conventional winding 2. The diameter of the additional coil 1 is consequently much less than its length.

A measurement sensor 3 is located in the central portion of the interior of the cylindrical hollow body 13, the sensor 3 being capable of determining the strength of the magnetic field generated by the additional coil 1, in other words, the magnetic flux density produced by the coil 1.

The flux density thus measured is proportional to the current flowing through the working coil 5, so that the weight of the mass placed upon the pan 8 can be calculated from the measured value for the flux density in the additional coil 1 by using the formula set out above.

In the embodiment according to FIG. 4, the coil 1 is provided with a soft magnetic shield 17 to protect it against stray fields as well as soft iron magnetic flux conductors 11 to intensify the magnetic field of the coil 1. The material for these magnetic conductors and/or the magnetic shielding must have a linear magnetization curve and must not exhibit hysteresis.

With a constant value for the magnetic flux density B in magnetic circuit 6, the measured magnetic field of the additional coil 1 can be used to determine the electromagnetic force by resorting to the formula given above.

Figure 2:
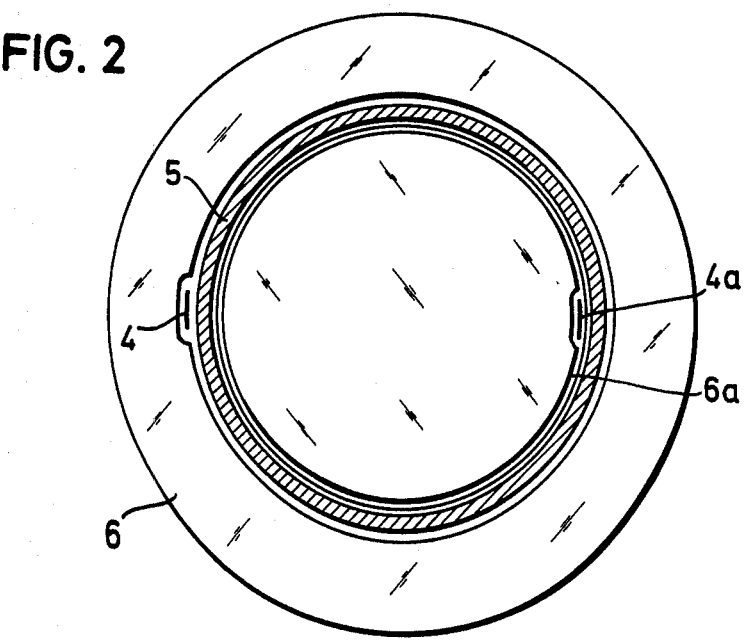
FIG. 2 is a cross-sectional view of the device of FIG. 1, the section being taken through the magnetic circuit and the working coil along section line A-B.

In order to allow for the temperature coefficients, as well as any aging phenomena which may be present in the components of rhe magnetic circuit 6, two additional measurement sensors 4 and 4a are disposed in the air gap 6a of the magnet system, the sensors 4 and 4a as shown in FIG. 2, being located on mutually opposite points on the circular magnetic circuit 6.

The magnetic flux density B of the magnetic circuit 6 is measured with the aid of the sensors 4 and 4a.

The values determined by the two measurement sensors 4 and 4a for the magnetic flux density of magnetic circuit 6 are averaged and processed further in a manner more fully described hereinbelow.

The measurement sensors 3, 4, and 4a can operate for example either according to the principle of magnetic nuclear dipole resonance or the principle of spin resonance. The design and function of such measurement sensors are well known and are described, for example, in the article "An Rb Magnetometer for a Wide Field Range and High Sensitivity" in PTB—Mitteilungen 4/74 pages 241 ff, and in a book by Kohlrausch, "Praktische Physik" (Practical Physics), Volume 2, 1968, page 274 under the heading "Nuclear Resonance".

FIG. 5 is a schematic diagram of the electronic portion of the device, with the mechanical and magnetic circuit components being shown diagrammatically. The output signal from the sensors 4 and/or 4a, which constitutes a measurement of the magnetic flux density B of the magnetic circuit 6, is converted into a digital signal by a resonance oscillator 20 and a frequency counter 22. In the case when only a single sensor 4 or 4a is used, its output can be fed directly to the oscillator 20. In the case outputs from both of the sensors 4 and 4a are used, the outputs are first fed to an averaging circuit 18, which averages the two signals, the average then being fed to the oscillator 20.

The output signal from the additional coil 1, which is proportional to the coil current I of the working coil 5, is likewise converted into a digital signal by a resonance oscillator 21 and a frequency counter 23. The two frequency counters share a common time base, provided by the output of a quartz oscillator 19. The two electrical signals from the frequency counters are combined in an arithmetic multiplier 24, which generates signal output values proportional to the electromagnetic force in accordance with the equation $F = \text{const} \times B \times I$.

The output signal from the multiplier 24 is processed further, in the usual manner, in a conventional processor 25 wherein, for example, the output signal from the multiplier 25 is tared, averaged, and the like so that the measurement result can finally be displayed on a readout display 26.

It is to be understood that the foregoing description and accompanying drawings relates to embodiments set out by way of illustation, not by way of limitation. Numerous other embodiments and variants are possible with the spirit and scope of the invention its scope being defined by the appended claims.

What is claimed is:

1. In an electromagnetically compensating force-measuring or weighing device having a working coil disposed in an air gap of a fixed magnetic circuit and subject to the influence of the load to be measured, an indicator means responsive to the position of the working coil, a control amplifier coupled to the indicator means and responsive to its output, and means for feeding an output signal from the control amplifier to the working coil for bringing it to a zero position, the improvement comprising an additional coil connected electrically in series with said working coil, and a first measurement sensor means positioned to sense the magnetic field of said additional coil free of system feedback for producing an output signal representative of the current flowing through said working coil and said further coil.

2. An improved device according to claim 1, wherein said first measurement sensor means comprise a sensor disposed inside said additional coil.

3. An improved device according to claim 1, wherein said first measurement sensor means comprise at least one sensor of the magnetic nuclear resonance type.

4. An improved device according to claim 1, wherein said first measurement sensor means comprise at least one sensor of the spin resonance type.

5. An improved device according to claim 1, wherein said additional coil is a coil having a diameter much less than its length.

6. An improved device according to claim 1, wherein said first measurement sensor means is a measurement sensor located approximately at the center of said additional coil.

7. An improved device according to claim 1, including a magnetic shield positioned about said additional coil.

8. An improved device according to claim 1, including magnetic flux conductor means for providing a low reluctance path for flux produced by said additional coil.

9. An improved device according to claim 1, wherein said first measurement sensor means comprise at least one sensor disposed permanently in said air gap.

10. An improved device according to claim 1, wherein said first measurement sensor means comprise at least two sensors disposed permanently in said air gap.

11. An improved device according to claim 1, wherein said first measurement sensor means comprise at least one sensor fastened on said working coil in said air gap.

12. An improved device according to claim 1, wherein said first measurement sensor means comprise at least two sensors fastened on said working coil in said air gap.

13. An improved device in accordance with claim 1, wherein said sensor means comprises sensor means of the magnetic nuclear dipole resonance type.

14. An improved device in accordance with claim 1, wherein said sensor means comprise sensor means of the spin resonance type.

15. An improved device according to claim 1, including at least one additional measurement sensor means positioned in said air gap to sense magnetic flux density B of said magnetic circuit air gap for producing an output signal constituting a measure of the load to be measured in conjunction with said output signal from said first measurement sensor.

16. An improved device according to claim 15, wherein said additional measurement sensor means comprise two measurement sensors mounted at mutually opposite positions in said air gap of said magnetic circuit, and means coupled to said sensors and responsive to output signals therefrom for averaging these output signals.

17. An improved device according to claim 16, wherein said first and said additional measurement sensor means comprise sensors of the magnetic nuclear dipole resonance type.

18. An improved device according to claim 16, wherein said first and said additional measurement sensor means comprise sensors of the spin resonance type.

19. In an electromagnetically compensating force-measuring or weighing device having a working coil disposed in an air gap of a fixed magnetic circuit and subject to the influence of the load to be measured, indicator means responsive to the position of the working coil, a control amplifier coupled to the indicator means and responsive to its output, and means for feeding an output signal from the control amplifier to the working coil for bringing it to a zero position, the improvement comprising an additional coil connected electrically in series with said working coil, and a first measurement sensor means positioned to sense the magnetic field of said additional coil for producing an output signal representative of the load to be measured, and at least one additional measurement sensor means positioned in said air gap to sense magnetic flux density B of said magnetic circuit air gap for producing an output signal constituting a measure of the load to be measured in conjunction with said output signal from said first measurement sensor.

20. An improved device according to claim 19, wherein said additional measurements sensor means comprise two measurement sensors mounted at mutually opposite positions in said air gap of said magnetic circuit, and means coupled to said sensors and responsive to output signals therefrom for averaging these output signals.

21. An improved device according to claim 20, wherein said first and said additional measurement sensor means comprise sensors of the magnetic nuclear resonance type.

22. An improved device according to claim 20, wherein said first and second additional measurement sensor means comprise sensors of the spin resonance type.

23. In an electromagnetically compensating force-measuring or weighing device having a working coil disposed in an air gap of a fixed magnetic circuit and subject to the influence of the load to be measured, indicator means responsive to the position of the working coil, a control amplifier coupled to the indicator means and responsive to its output, and means for feeding an output signal from the control amplifier to the working coil for bringing it to a zero position, the improvement comprising an additional coil connected electrically in series with said working coil, a first measurement sensor means positioned to sense the magnetic field of said additional coil for producing an output signal representative of the load to be measured, and magnetic flux conductor means for providing a low reluctance path for flux produced by said additional coil.

24. In an electromagnetically compensating force-measuring or weighing device having a working coil disposed in an air gap of a fixed magnetic circuit and subject to the influence of the load to be measured, indicator means responsive to the position of the working coil, a control amplifier coupled to the indicator means and responsive to its output, and means for feeding an output signal from the control amplifier to the working coil for bringing it to a zero position, the improvement comprising an additional coil connected electrically in series with said working coil, and a first measurement sensor means positioned to sense the magnetic field of said additional coil for producing an output signal representative of the load to be measured, and wherein said first measurement sensor means comprise at least one sensor disposed permanently in said air gap.

25. An improved device according to claim 24, wherein said at least one sensor comprises at least two sensors disposed permanently in said air gap.

26. An improved device according to claim 24, wherein said first measurement sensor means comprise at least one sensor fastened on said working coil in said air gap.

27. An improved device according to claim 24, wherein said first measurement sensor means comprise at least two sensors fastened on said working coil in said air gap.

* * * * *